H. F. KOCH.
HEATER.
APPLICATION FILED JAN. 9, 1918.
1,298,517.
Patented Mar. 25, 1919.
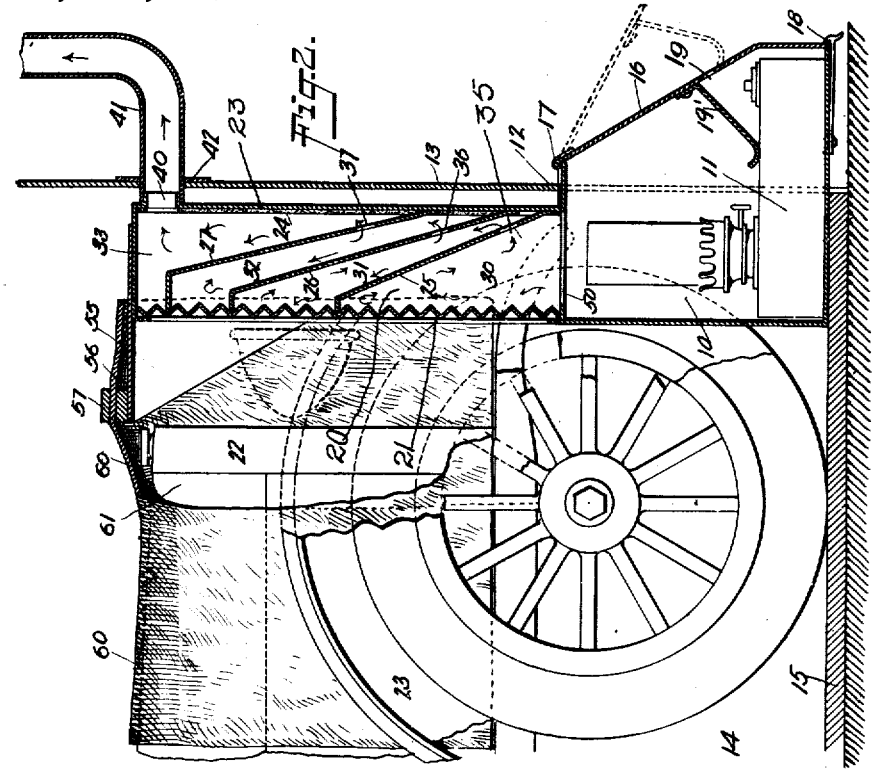
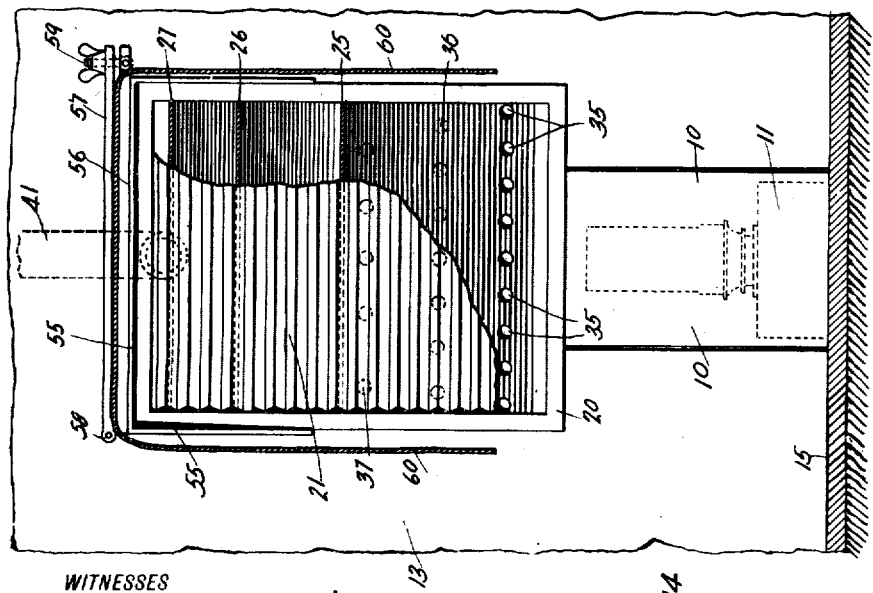
WITNESSES
William P. Goebel.
Geo. H. Hosler.
INVENTOR
Hugo F. Koch
BY Munn & Co
ATTORNEYS

UNITED STATES PATENT OFFICE.

HUGO F. KOCH, OF NEW YORK, N. Y.

HEATER.

1,298,517.  Specification of Letters Patent.  Patented Mar. 25, 1919.

Application filed January 9, 1918. Serial No. 211,034.

*To all whom it may concern:*

Be it known that I, HUGO F. KOCH, a citizen of the United States, and a resident of the city of New York, borough of Manhattan, in the county and State of New York, have invented a new and Improved Heater, of which the following is a full, clear, and exact description.

The object of the invention is to provide a new and improved heater more especially designed for use in garages and arranged to heat the radiator of an automobile to prevent freezing of the water therein during cold weather. Another object is to provide a heater which when installed in a garage complies with the rules of the fire underwriters.

In order to accomplish the desired result, use is made of a lamp casing containing a lamp and adapted to extend through an opening in a wall of a garage, a heating chamber rising from the top of the said lamp casing within the garage, the heating chamber receiving the heat emanating from the lamp burning in the lamp casing, the front of the heating chamber being corrugated and arranged in juxtaposition to the front of a radiator of an automobile driven up to the heater in the garage. Use is also made of partitions within the heating chamber, the partitions extending from the back of the heating chamber upwardly and forwardly to the front thereof, each partition having openings at its lower end for the passage of the heat, and an outlet pipe leading from the top of the heating chamber and extending through a wall of the garage to the outside thereof. Use is further made of a cover of felt or other textile material attached to the heating chamber and extending over the radiator and the engine hood of the automobile.

A practical embodiment of the invention is represented in the accompanying drawings forming a part of this specification, in which similar characters of reference indicate corresponding parts in both views.

Figure 1 is a front elevation of the heater as applied and with part of the heater front shown broken out, the covering robe and the floor of the garage being shown in section; and Fig. 2 is a sectional side elevation of the same with the automobile in position.

The lamp casing 10 is adapted to contain a kerosene or similar lamp 11, and the lamp casing 10 extends through an opening 12 in a wall 13 of a garage 14 so that the lamp casing 10 projects within the garage and rests on the floor 15 thereof, as indicated in the drawings. The lamp casing 10 is provided at its outer end with a suitable door 16, preferably hinged at its upper end at 17 to the top of the lamp casing 10, and the said door 16 is normally locked in closed position by a suitable spring catch 18 attached to the bottom of the lamp casing. The door 16 is provided with a vent 19 over the filler cap of the lamp 11 to discharge into the outer air any vapors that may arise from the fuel in the lamp 11 and escape by way of the filler cap, such venting being aided by the obliquely disposed baffle 19'.

From the top of the lamp casing 10 within the garage 14 extends upwardly a heating chamber 20 provided with a corrugated front 21 arranged approximately opposite the front of a radiator 22 of an automobile 23 of usual construction and driven up to the heater, as indicated in Fig. 2. The heating chamber 20 has its back 23 spaced from the wall 13, and the back 23 is preferably provided with a lining 24 of asbestos or other material to protect the wall 13 from the heat of the heater. Within the heating chamber 20 is arranged a series of partitions 25, 26 and 27 extending from the back 23 upwardly and forwardly and connecting at their upper ends with the front 21 at points spaced apart in a vertical direction, thus dividing the interior of the heating chamber 20 into a series of compartments 30, 31, 32 and 33. The lower ends of the partitions 25, 26 and 27 are provided with openings 35, 36 and 37 to allow the heat from the compartment 30 to pass by way of the openings 35 into the compartment 31 and to allow the heat from the latter compartment to pass by way of the openings 36 into the compartment 32 and to permit the heat from this compartment to pass by way of the openings 37 into the top compartment 33. From the back of this compartment extends a nipple 40 connected with a chimney outlet, smoke outlet or chimney pipe 41 which passes through an opening 42 in a wall 13 of the garage to the outside thereof. It will be noticed that the top of the lamp casing 10 is connected by an opening 50 with the bottom of the compartment 30 so that the heat emanating from the burning lamp 11 passes through this opening 50 into the compartment 30 to heat the corresponding portion of the front 21 of the heating chamber 20. The heat in the compartment 30 can pass by way of the openings 35 into the compartment 31 to heat the corresponding portion of the front 21, and the heat from this compartment 31 can pass by way of the openings 36 into the compartment 32 to heat the corresponding portion of the front 21, and the heat from this compartment 32 can pass by way of the openings 37 into the compartment 33 to heat the top portion of the front 21. It will be noticed that by locating the openings 35, 36 and 37 near the lower ends of the partitions 25, 26 and 27 the heat is retained in the several compartments before passing out of the smoke flue 41. It will also be noticed that by the arrangement described the corrugated front 21 is heated from the heat in the several compartments and this heat is radiated to the radiator 22 of the automobile to keep the water in the radiator and engine from freezing during cold weather.

The heating chamber 20 is provided at the top with an inwardly projecting hood 55 provided on the top with clamping bars 56 and 57, of which the clamping bar 56 is secured to the hood 55 and the clamping bar 57 is hinged at 58 to the clamping bar 56 and is fastened thereto at its free end by a pivoted clamping screw 59 to hold a cover 60 clamped between the clamping bars 56 and 57. This cover 60 is made of felt, cloth, or other suitable material, and is arranged to extend over the radiator 22 and the hood 61 of the automobile 23 to retain the heat emanating from the corrugated front 21 at the radiator 22 and within the hood 61 thereby preventing freezing of the water in the radiator and the water jacket of the engine. It is understood that the cover 60 is removed from the clamping bars 56 and 57 when the automobile is not in position at the heater, but after the automobile has been driven up to the heater then the cover is applied and extended over the hood 61 and the radiator 22, as above explained and shown in Fig. 2.

From the foregoing it will be seen that the heater is not liable to set fire to the garage, and the heating chamber is so arranged that its front is close to the front of the radiator 22 of the automobile after the latter is driven up in the garage into proper position relative to the heater.

The heater shown and described is very simple and durable in construction, can be cheaply manufactured and readily installed in a garage, and a heater so installed is in compliance with the rules and regulations of the fire underwriters.

Although the heater is more especially designed for use in garages it is evident that it may be safely used in other structures and buildings in which gasolene or other easily inflammable liquids, gases, explosives and the like are housed, or manufactured, and which it is not permissible to heat with ordinary stoves or similar heaters.

Having thus described my invention, I claim as new and desire to secure by Letters Patent:—

1. A heater for use in garages, comprising a lamp casing containing a lamp and adapted to extend through an opening in a wall of the garage, and a heating chamber rising from the top of the said lamp casing to be within the garage, the heating chamber receiving the heat emanating from the lamp burning in the lamp casing, the front of the heating chamber being corrugated and adapted to be arranged in juxtaposition to the front of a radiator of an automobile driven up to the heater.

2. A heater for use in garages, comprising a lamp casing containing a lamp and adapted to extend through an opening in a wall of a garage, a heating chamber rising from the top of the said lamp casing to be within the garage, the heating chamber receiving the heat emanating from the lamp burning in the lamp casing, the front of the heating chamber being corrugated and adapted to be arranged in juxtaposition to the front of a radiator of an automobile driven up to the heater, an inwardly projecting hood on the upper portion of the said heating chamber, and a cover held on the said hood and adapted to cover the radiator and the engine hood of the automobile.

3. A heater for use in garages, comprising a lamp casing containing a lamp and adapted to extend through an opening in a wall of a garage, a heating chamber rising from the top of the said lamp casing to be within the garage, the heating chamber receiving the heat emanating from the lamp burning in the lamp casing, the front of the heating chamber being corrugated and adapted to be arranged in juxtaposition to the front of a radiator of an automobile driven up to the heater, and an outlet pipe adapted to extend from the upper end of the said heating chamber through a wall of the garage to the outside thereof.

4. A heater for use in garages, comprising a lamp casing containing a lamp and adapted to extend through an opening in a wall of a garage, the lamp casing having a door adapted to be outside of the garage to gain access to the lamp in the lamp casing, a heating chamber rising from the top of the said lamp casing to be within the garage, the heating chamber receiving the heat emanating from the lamp burning in the lamp casing, the front of the heating chamber being corrugated and adapted to be arranged in juxtaposition to the front of a radiator of an automobile driven up to the heater, the said heating chamber having a series of partitions extending from the back of the heating chamber upwardly and forwardly to the front thereof, each partition having openings at its lower end for the passage of the heat, and an outlet pipe leading from the top of the heating chamber and adapted to extend through a wall of the garage to the outside thereof.

5. A heater as characterized including a casing adapted to extend through an opening in the wall of a garage, said casing comprising a heat generating chamber at its lower end, and a heat distributing member disposed above the heat generating chamber, the heat distributing member including vertically disposed front and rear walls, and a series of partitions beginning at the rear wall and extending obliquely therefrom to the front wall and dividing the heat distributing member into a plurality of heat distributing chambers directing heat to the front walls across superposed zones.

6. A heater for use in garages, comprising a casing containing a heat generating chamber at its lower end and adapted to extend through an opening in a wall of a garage, a heating chamber extending from the top of the heat generating chamber and receiving heat from the heat generating chamber, the front of the heating chamber adapted to be arranged in juxtaposition to the front of a radiator of an automobile driven up to the heater and an inwardly projecting hood on the upper portion of said heating chamber.

7. A heater for use in garages comprising a casing adapted to contain a heat generating element in its lower portion, and a heat distributing chamber above the same, said heat distributing chamber including a corrugated front wall and bent partitions dividing the same into a plurality of heat distributing chambers.

8. A heater as characterized including a casing adapted to extend through an opening in the wall of a garage, said casing comprising a heat generating chamber at its lower end, and a heat distributing member, disposed above the heat generating chamber, the heat distributing chamber including a series of partitions extending from the back of the heat distributing member upwardly and forwardly to the front thereof, each partition having openings at its lower end for the upward passage of heat and products of combustion.

HUGO F. KOCH.